W. H. PUTTERGILL.
SAFETY GUARD FOR THE FRONT WHEELS OF MOTOR ROAD VEHICLES.
APPLICATION FILED SEPT. 17, 1918.
1,326,094.
Patented Dec. 23, 1919.
5 SHEETS—SHEET 2.
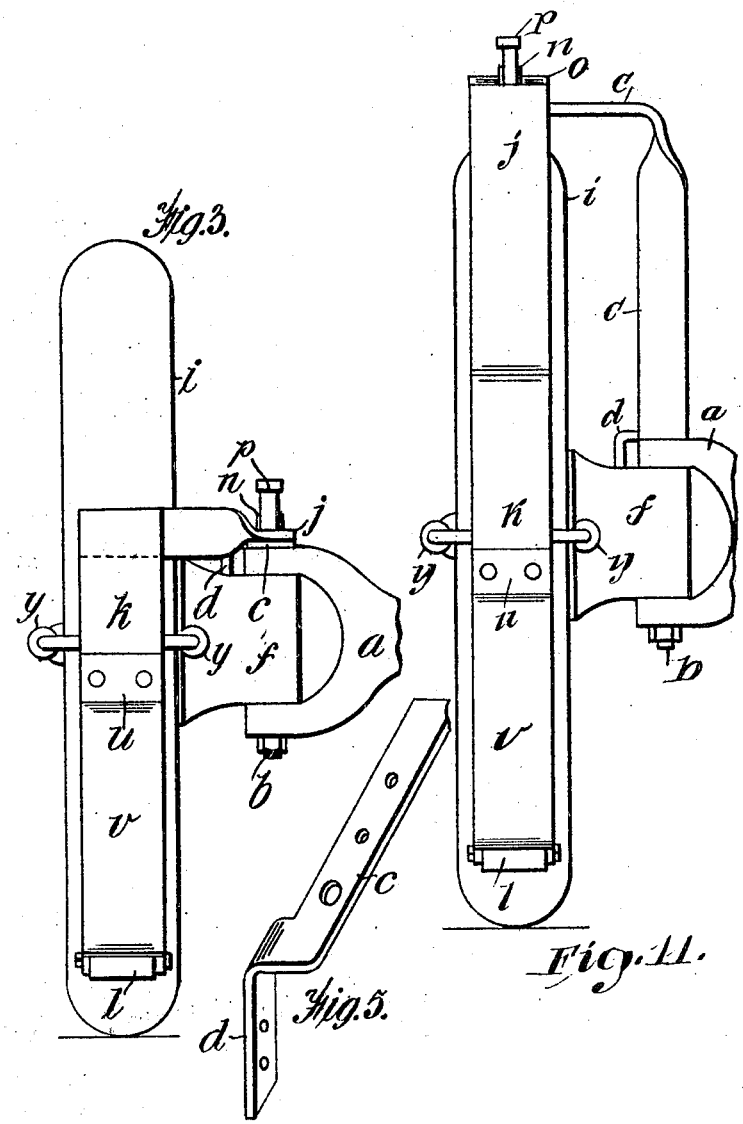
INVENTOR
WILLIAM HENRY PUTTERGILL W. H. PUTTERGILL.
SAFETY GUARD FOR THE FRONT WHEELS OF MOTOR ROAD VEHICLES.
APPLICATION FILED SEPT. 17, 1918.
1,326,094.
Patented Dec. 23, 1919.
5 SHEETS—SHEET 3.
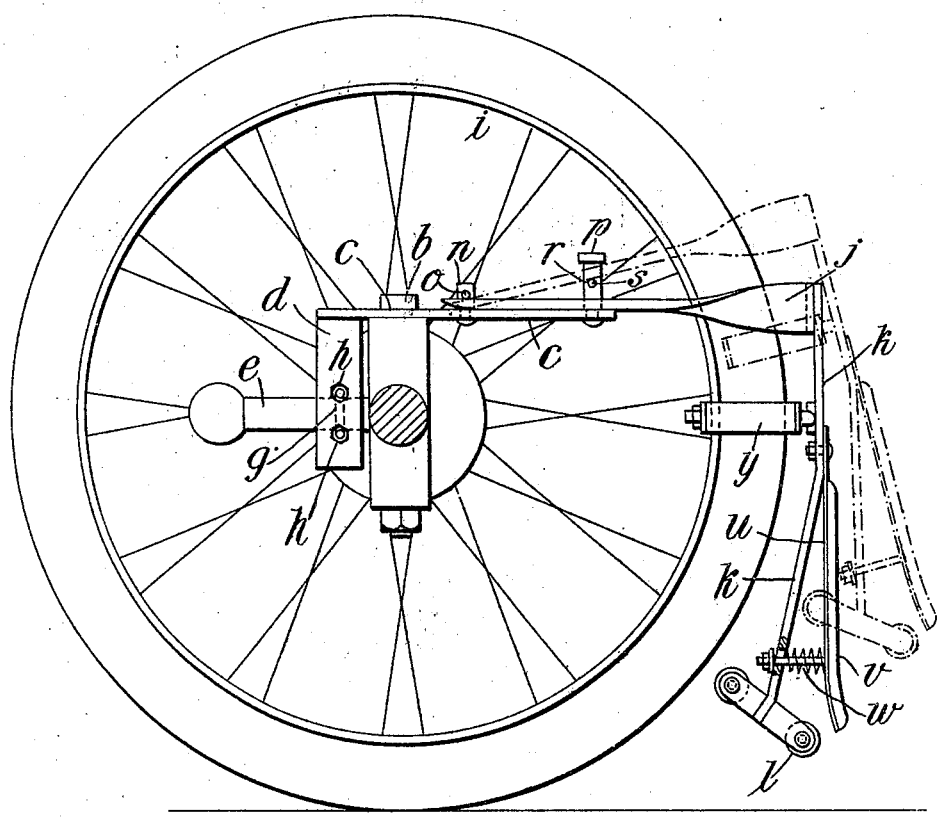
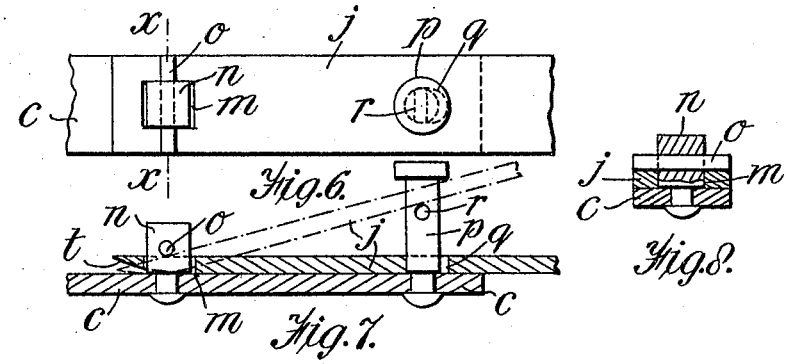
INVENTOR
WILLIAM HENRY PUTTERGILL
By
Attorney W. H. PUTTERGILL.
SAFETY GUARD FOR THE FRONT WHEELS OF MOTOR ROAD VEHICLES.
APPLICATION FILED SEPT. 17, 1918.

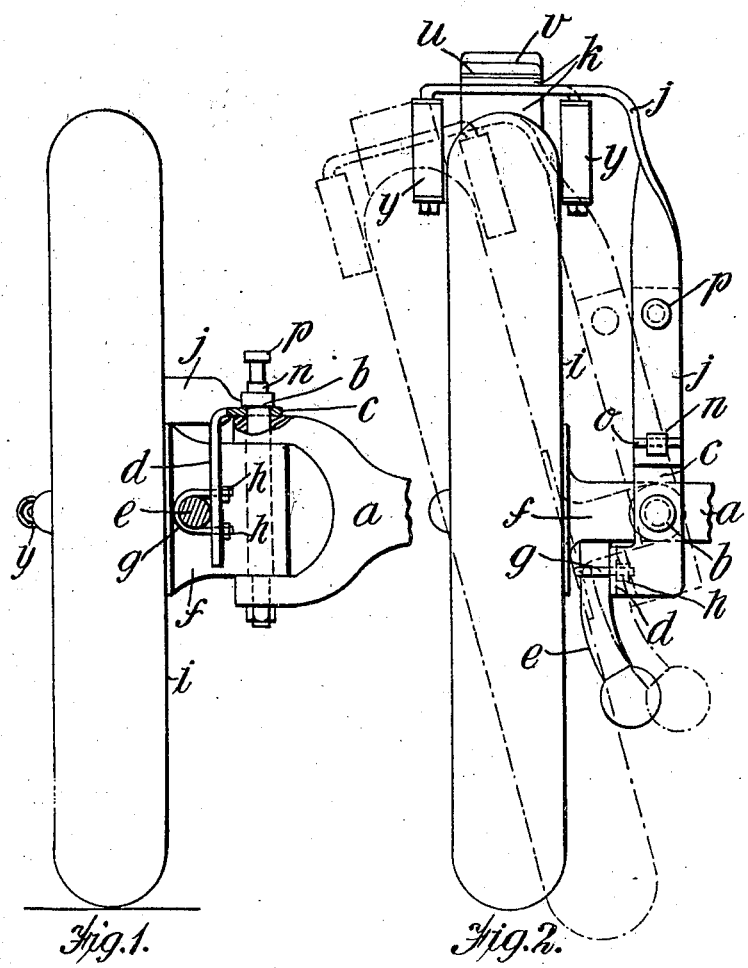

1,326,094.

Patented Dec. 23, 1919.
5 SHEETS—SHEET 4.

INVENTOR
WILLIAM HENRY PUTTERGILL

UNITED STATES PATENT OFFICE.

WILLIAM HENRY PUTTERGILL, OF HERNE HILL, LONDON, ENGLAND.

SAFETY-GUARD FOR THE FRONT WHEELS OF MOTOR ROAD-VEHICLES.

1,326,094.  Specification of Letters Patent.  Patented Dec. 23, 1919.

Application filed September 17, 1918.  Serial No. 254,451.

*To all whom it may concern:*

Be it known that I, WILLIAM HENRY PUTTERGILL, a subject of the King of Great Britain and Ireland, and a resident of Herne Hill, county of London, England, have invented a certain new and useful Improvement in Safety-Guards for the Front Wheels of Motor Road-Vehicles, of which the following is a specification.

This invention relates in general to safety guards for motor road vehicles, and more particularly to a novel improvement in safety guard construction especially adapted for use in guards of the type employed in connection with the front wheels of motor buses and the like.

It has been found desirable that safety guards should be mounted in such a manner that they move with the front wheels of the vehicle and in accordance with the movement of the steering wheel of said vehicle. That is to say, the invention purposes to provide a construction of lifeguard which is adapted to turn around the pivot of the stub, and dead axle of a front wheel, and is directly connected to and is moved by the steering arm of said stub axle. Further, the invention contemplates the provision of an improved means which allows of the lifting of the guard when entering a garage or the like or when striking against the road surface.

With the above and other objects in view which will more readily appear as the nature of the invention is better understood, the same consists in the novel construction, combination and arrangement of parts hereinafter more fully described, illustrated and claimed.

A preferred and practical embodiment of the invention is illustrated in the accompanying sheets of drawings, wherein:

Figure 1 is a rear view showing the application of the invention to a left hand front wheel.

Fig. 2 is a plan view thereof.

Fig. 3 is a front view.

Fig. 4 is an elevation thereof viewed from inside the wheel.

Fig. 5 is a perspective view of a guard carrier hereinafter referred to.

Fig. 6 is a plan view, drawn to an enlarged scale, showing the manner in which the guard is hinged to the bracket.

Fig. 7 is a longitudinal sectional view thereof.

Fig. 8 is a sectional view, taken on line $x$, $x$ of Fig. 6.

Fig. 11 is a front view of Fig. 9.

Like letters of reference indicate corresponding parts in the several figures.

In carrying out the invention, and referring first to Figs. 1 to 8, of the accompanying drawings, there is loosely mounted on the end of the dead axle $a$ so as to be rotatable around the pivot pin $b$ thereof and said dead axle $a$ a guard carrier $c$ which at its rear end is provided with a downward extension $d$ affixed to the steering arm $e$ of the stub axle $f$ by screw staple $g$ and nuts $h$ in such manner that the front extending portion of the carrier $c$ is maintained always parallel with the longitudinal axis of the wheel $i$ and moves laterally therewith when said wheel is moved by the steering arm. On top of the carrier $c$, which is horizontally disposed, is pivotally mounted the front arm $j$ of the guard $k$, said front arm $j$ which extends to in front of the wheel $i$ being cranked in order that the depending guard $k$ carried by said arm $j$ may hang in vertical, central longitudinal alinement with the wheel $i$.

To allow the lifting of the guard $k$, in the event of its lower roller $l$ striking the ground, and the pivotal movement of the front arm $j$ of said guard $k$, said arm $j$ is provided with a centrally disposed slot $m$ which takes over a square shaped stud $n$ attached to the carrier $c$ so that said arm $j$ normally rests flat on said carrier $c$, a pin $o$, which pin also acts as the pivot, being passed through said stud $n$ and across said arm $j$, keeping the same in position. To guide and limit the upward movement of the arm $j$ and consequently the guard $k$, there is fixed to the carrier $c$ and in central alinement with the stud $n$ thereon, a headed pin $p$ which extends upward through an elongated hole $q$ in the arm $j$, said headed pin $p$ being provided with a hole $r$ for the reception of a pin $s$ to keep the guard up, as shown in dotted lines Fig. 4 when passing over the curb to enter a garage or the like. The rear end of the arm $j$ is on its underside provided with a curved face $t$ to allow of said arm $j$ pivoting on the underside of the pin $o$ of the stud n as shown most clearly in Fig. 7.

To the front and lower part of the guard k there is attached a movable plate u of a width sufficient to cover said guard k, and between said plate u, which is provided with a pad v and the guard k, there is interposed a buffer w to reduce force of impact.

Further, to prevent the guard from being bent sidewise of the wheel i, said guard is provided with a backwardly extending fork or arms y, y which take one on each side of the wheel i, but are not operated thereby to move the guard.

Figures 9, 10:
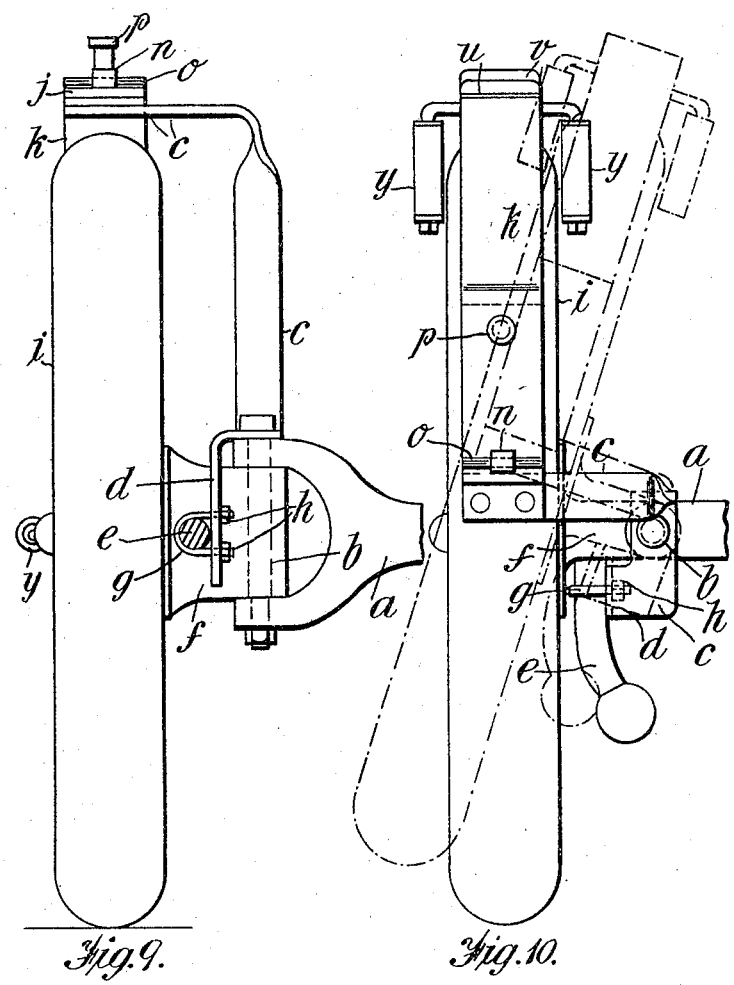
Fig. 9 is a view, similar to Fig. 1, but showing a slight modified arrangement thereof.
Fig. 10 is a plan view of Fig. 9.
Figure 12:
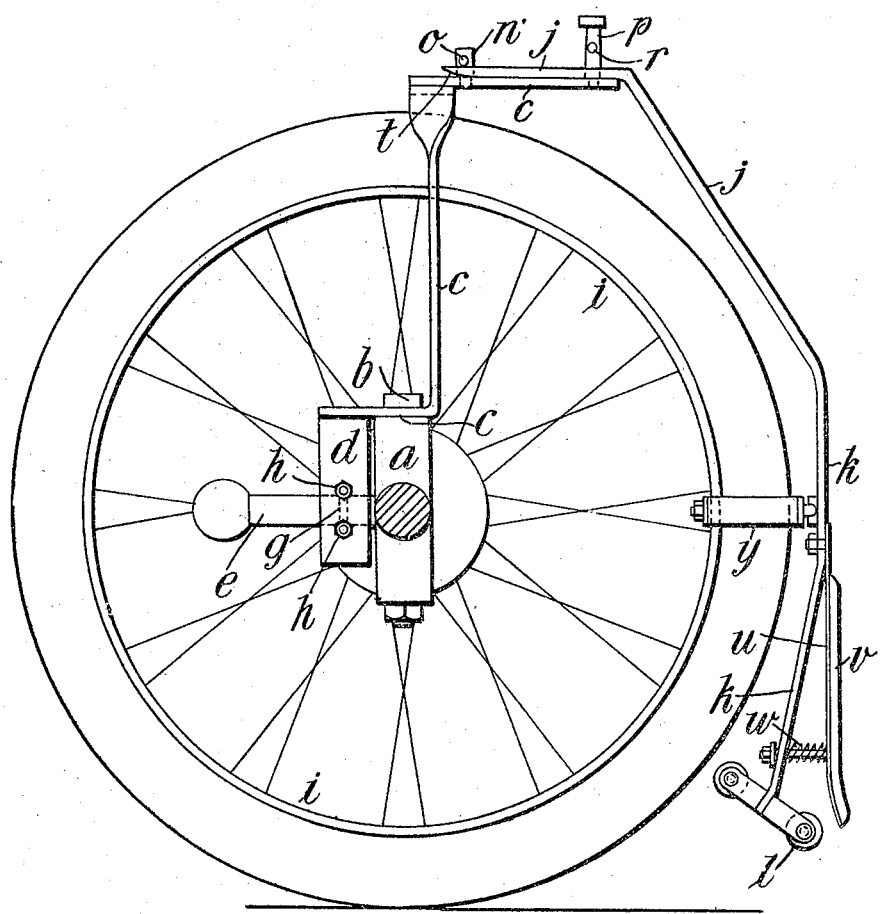
Fig. 12 is an inside elevation of Fig. 9.

Referring now to Figs. 9 to 12, the arrangement and working of the guard is precisely the same as above described with the exception that the carrier arm c instead of being horizontally disposed is now carried up vertically to above the wheel and cranked over the same and carried horizontally to meet the rear end of the arm j of the guard, which arm is lengthened to extend downward in front of the wheel.

Having now described my invention what I claim as new and desire to secure by Letters Patent of the United States is:—

1. A wheel guard including in combination with a fixed axle and a stub axle pivoted thereto and having a steering arm, a bracket pivotally supported on the dead axle by the pivot pin which holds the fixed and stub axles together, said bracket having a rearwardly extending arm portion adapted to be secured to said steering arm, and a forwardly extending wheel guard supporting portion, a wheel guard having a relatively hinged support and connection with the forwardly extending portion of said bracket, and also having means at its lower end for relieving the shock of encountering an obstruction.

2. In safety guards, the combination with the carrier arm, rotatable about the pivot pin of the stub axle and connected to and moving with the steering arm and in parallel with the wheel, of a guard proper with rearwardly extending arm thereto, means pivotally connecting the rear end of said arm to the carrier arm, means for guiding said arm in its vertical movements and means for maintaining, when required, said arm and guard in its uppermost raised position.

3. A safety guard comprising in combination a horizontally disposed carrier arm rotatable around the pivot pin of the stub axle, a downwardly extending rear portion to said carrier arm, means for securing said rear portion to the steering arm, a guard proper with rearwardly extending arm provided at its rear end with curved under face, a square slot and an elongated hole in said rear arm, a square stud and a headed pin carried by the carrier arm and taking in the square slot and elongated hole respectively, a pin extending through said stud and across the upper face of the guard arm, a padded plate flexibly connected to the front of the guard proper and a buffer interposed between said plate and said guard.

In testimony whereof I have affixed my signature this 19th day of August 1918.

WILLIAM HENRY PUTTERGILL.